United States Patent
Michels

(10) Patent No.: US 11,593,763 B2
(45) Date of Patent: Feb. 28, 2023

(54) AUTOMATED ELECTRONIC MAIL ASSISTANT

(71) Applicant: KBC GROEP NV, Brussels (BE)

(72) Inventor: Sarah Michels, Haacht (BE)

(73) Assignee: KBC GROEP NV, Brussels (BE)

(*) Notice: Subject to any disclaimer, the term of this patent is extended or adjusted under 35 U.S.C. 154(b) by 107 days.

(21) Appl. No.: 17/285,254

(22) PCT Filed: Nov. 14, 2019

(86) PCT No.: PCT/EP2019/081305
§ 371 (c)(1),
(2) Date: Apr. 14, 2021

(87) PCT Pub. No.: WO2020/099550
PCT Pub. Date: May 22, 2020

(65) Prior Publication Data
US 2021/0374677 A1   Dec. 2, 2021

(30) Foreign Application Priority Data
Nov. 14, 2018  (EP) ..................... 18206293

(51) Int. Cl.
*G06F 15/16* (2006.01)
*G06Q 10/107* (2023.01)
(Continued)

(52) U.S. Cl.
CPC .......... *G06Q 10/107* (2013.01); *G06F 40/35* (2020.01); *H04L 51/214* (2022.05)

(58) Field of Classification Search
CPC ...... G06Q 10/107; G06F 40/35; H04L 51/214
(Continued)

(56) References Cited

U.S. PATENT DOCUMENTS

| 6,411,947 B1 | 6/2002 | Rice et al. |
| 6,718,368 B1 | 4/2004 | Ayyadurai |

(Continued)

FOREIGN PATENT DOCUMENTS

WO    2020099550 A1    5/2020

OTHER PUBLICATIONS

ISR-WO for PCT/EP/2019/081305 dated Dec. 19, 2019.

*Primary Examiner* — Imad Hussain
(74) *Attorney, Agent, or Firm* — Vorys, Sater, Seymour and Pease LLP

(57) ABSTRACT

Multiple text parts of a body of an incoming e-mail are determined. For each text part, based on natural language processing, a topic category and a feature vector representation (FVR) are determined. For two text parts comprising a common topic category, a similarity value based on their FVR is calculated, and in case the similarity value fulfills a condition, the two text parts are aggregated into one aggregated text part. For each text part: a reference document is selected based on a FVR of the text part; a recipient is obtained based on the corresponding topic category; and an e-mail comprising the text part, and each selected reference document or a pointer thereto, is sent to the obtained recipient. Via aggregation of text parts based on FVR, computational resources for document retrieval based on FVR is reduced, as well as the number of outgoing e-mails.

12 Claims, 7 Drawing Sheets

(51) Int. Cl.
*G06F 40/35* (2020.01)
*H04L 51/214* (2022.01)

(58) Field of Classification Search
USPC .......................................... 709/206
See application file for complete search history.

(56) References Cited

U.S. PATENT DOCUMENTS

| | | | |
|---|---|---|---|
| 2002/0107926 A1 | 8/2002 | Lee | |
| 2005/0283474 A1 | 12/2005 | Francis et al. | |
| 2007/0106736 A1* | 5/2007 | Shepherd | G06Q 10/107 |
| | | | 709/206 |
| 2007/0208727 A1 | 9/2007 | Saklikar et al. | |
| 2010/0223338 A1* | 9/2010 | Hodes | G06Q 10/107 |
| | | | 709/206 |
| 2013/0007144 A1* | 1/2013 | Ahern | G06Q 10/107 |
| | | | 709/206 |
| 2016/0234145 A1* | 8/2016 | Kozinchik | G06F 40/134 |
| 2016/0330144 A1* | 11/2016 | Dymetman | G06F 16/48 |
| 2016/0357855 A1 | 12/2016 | Fan et al. | |
| 2020/0134422 A1* | 4/2020 | Gliozzo | G06N 3/0427 |

\* cited by examiner

AUTOMATED ELECTRONIC MAIL ASSISTANT

TECHNICAL FIELD

The invention pertains to the technical field of computer-aided management of electronic mail (CPC G06Q10/107).

BACKGROUND

Electronic mail is a ubiquitous asynchronous text-based communication method. Electronic mail messages comprising questions on specialized topics may be intended for corresponding expert recipients, the identity of which may be unknown to the sender. A single electronic mail message may comprise multiple questions intended for different corresponding expert recipients, requiring the distribution of the questions and the generation of an aggregate answer. An expert recipient may have to deal with a plurality of related or identical questions, the answering of which is a repetitive time-consuming task. An expert recipient may have to consult and/or provide electronic text-based documentation in drafting a response to an electronic mail message, the retrieval of which may be difficult and time-consuming. In the prior art, several of these problems have been addressed.

U.S. Pat. No. 6,411,947 B1 discloses an automatic message interpretation and routing system and method. An incoming electronic mail from a source is categorized according to its subject matter content for prioritization, prior to transferring the electronic mail to a review inbox for subsequent retrieval by a human operator. If possible, one or more predetermined responses for proposed release and delivery to the source are retrieved and routed to the review inbox along with the electronic mail. The document discloses detecting combinations of prominent words (or text) and patterns of text within an electronic message using a character matcher, preferably including a trigram character matching algorithm. The document furthermore discloses that proper removal of certain literals is important in automatically interpreting electronic mail.

The document does not provide for selecting one or more expert recipients. The document does not provide for handling multiple questions on specialized topics.

U.S. Pat. No. 6,718,368 B1 discloses a system and method for content-sensitive automatic reply message generation for text-based asynchronous communications. A filter and modeler performs language analysis and characterization of the content of the text message, yielding a tagged message. The filter and modeler employs feature extraction methods, which can be any one or multiple methods of pattern recognition, such as keyword analysis, morphology, natural language processing, thesauri, co-occurrence statistics, syllabic analysis and word analysis. The feature extraction methods result in several output signals, which may include keyword frequencies, co-occurrence statistics, a dimensionally-reduced representation of the keyword frequencies, phoneme frequencies, structural pattern statistics for sentences, paragraphs, and pages, estimated education level of the author based on word choices and complexity of sentence structure, and customer type. Based on the tags, an automatic reply generator retrieves from a library of phrases partial replies or reply phrases for each issue and request presented, introductory phrases based on the attitude of the customer, and may further re-select these replies based on educational level of the customer. The proposed message is presented to a user via an enhanced user interface, with the tags and the original message. The user's changes are received by a learning process, which updates reasoning and analysis logic of the filter and modeler, such that future tag generation is more precise.

The document does not provide for selecting one or more expert recipients. The document does not provide for handling multiple questions on specialized topics.

US 2002/0 107 926 A1 discloses a system and method for routing an electronic mail to a best qualified recipient by using machine learning. A learning agent builds learning models corresponding to recipients from electronic mails stored in a mail server, based on word extraction and indexing.

The document does not provide for retrieval of relevant information for replying. The document does not provide for handling multiple questions on specialized topics.

US 2007/0 208 727 A1 discloses a trust metric-based querying method. The document discloses ([0104], [0106]) juxtaposition of context information (specific domain of inquiry or expertise) with trust indicators to select a candidate recipient for a question. The document further discloses ([0114], [0136], [0137]), the automatic splitting of a given query which contains multiple questions into multiple queries.

US 2005/0 283 474 A1 discloses a method of assembling a knowledge database containing question and answer pairs. The method comprises the steps of: extracting questions from a multiplicity of electronic communications; enabling the sender of the communication to examine and select or deselect the extracted question(s); classifying each question based upon the content of the question and identifying keywords in each question; entering the questions into the database together with their respective classifications and keywords; and entering into the database answers corresponding to the entered questions. An answer to a question may be found by classifying the question and identifying keywords therein, identifying questions contained in the database which have the same or similar classification and which contain some or all of the same keywords, and identifying the corresponding answers. The document discloses ([0151]) in an embodiment the retrieval of the same answer for multiple questions which are fundamentally the same, but which are merely phrased in a different way.

Provision of a document and/or answer and/or output on a query and/or question and/or input requires a considerable amount of computational resources. None of US 2007/0 208 727 A1 and US 2005/0 283 474 A1 is concerned with lowering the computational resources.

The present invention aims to resolve at least some of the problems mentioned above.

SUMMARY OF THE INVENTION

In a first aspect, the present invention provides a computer-implemented method (CIM) for electronic mail routing, according to claim 1.

In a second aspect, the present invention provides a computer system for electronic mail routing, wherein the computer system is configured for performing the CIM according to the first aspect.

In a third aspect, the present invention provides a computer program product (CPP) for electronic mail routing, wherein the CPP comprises instructions which, when the CPP is executed by a computer system, cause the computer system to carry out the CIM according to the first aspect.

The present invention provides for determining multiple text parts in a body of an incoming electronic mail, and selecting for each text part, based on natural language processing, a topic category and a reference document associated with the corresponding topic category from each of at least one document database. For each text part, a recipient is obtained based on the corresponding topic category. A text part is then sent together with the corresponding reference document(s) or pointer(s) thereto to the corresponding recipient.

An electronic mail comprising multiple questions may be split into multiple text parts, wherein each text part comprises a question, and a particular text part may be forwarded together with relevant documentation (or a pointer thereto) to a corresponding expert. The present invention thereby provides integrated automated electronic mail assistance by (i) detecting multiple questions, (ii) routing each question to the relevant expert, and (iii) providing the relevant expert with additional relevant documentation.

Before the step of selecting for each text part a reference document associated with the topic category of the text part, which reference document selection is performed based on a feature vector representation of the text part, similarity of two text parts with a common topic category is assessed based on a similarity value based on their feature vector representations, and if a condition for the similarity value is fulfilled, the two text parts are aggregated into one aggregated text part.

The text part aggregation has the advantageous technical effects of:
lowering the required computational resources of selecting for each text part a document associated with the topic category, as there are less text parts;
reduction in the total number of outgoing e-mails, as there are less text parts.

In comparison with US 2005/0 283 474 A1 paragraph [0151], where the same answer is retrieved multiple times for multiple questions which are fundamentally the same, but which are merely phrased in a different way, the present invention provides for question aggregation before handling the question.

DETAILED DESCRIPTION OF THE INVENTION

Figure 1:
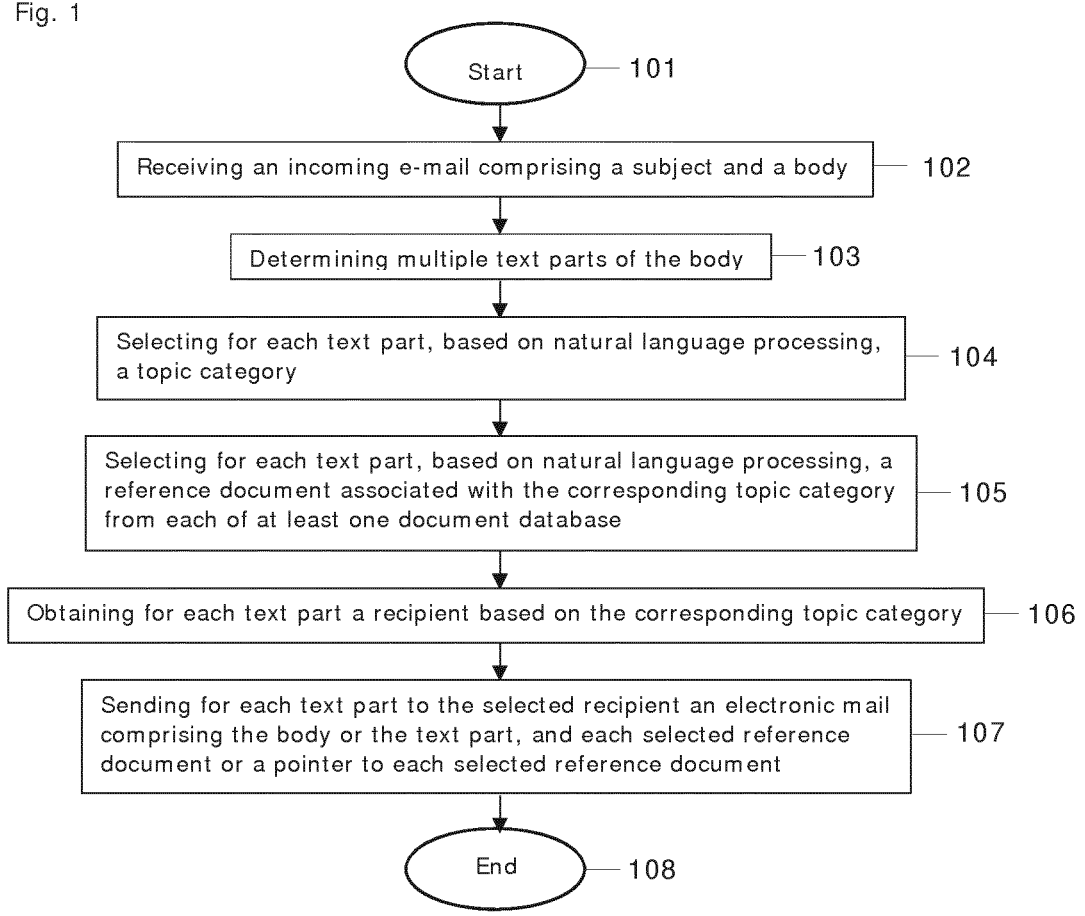
FIGS. 1 and 3 show schematic representations of embodiments of algorithms according to the present invention.

The present invention concerns a computer-implemented method (CIM), a computer system, and a computer program product (CPP) for electronic mail routing. The invention has been summarized in the corresponding section above. In what follows, the invention is described in detail, preferred embodiments are discussed, and the invention is illustrated by means of non-limiting examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specify the presence of what follows (e.g. component) and do not exclude or preclude the presence of additional, non-recited components, features, elements, members, steps, known in the art or disclosed therein.

"Based on" as used herein is an inclusive or open-ended term that specifies the dependence on what follows and does not exclude or preclude the dependence on additional, non-recited components, features, elements, members or steps.

"Feature vector representation" as used herein may refer to any numerical feature representation, and should not be interpreted as limited to a vector representation. For example, a bag-of-words or bag-of-N-grams representation, as used herein, is also a "feature vector representation".

An "item" or "training item" or "mail item" as used herein may refer to any one of a subject of an electronic mail, a body of an electronic mail, a text part of a body of an electronic mail, and an electronic text document.

In a first aspect, the present invention provides a CIM for electronic mail routing. In a second aspect, the present invention provides a computer system for electronic mail routing. The computer system is configured for performing the CIM according to the first aspect. The computer system may in particular comprise at least one processor for carrying out the steps of the CIM. In a third aspect, the present invention provides a CPP for electronic mail routing. The CPP comprises instructions for performing the CIM according to the first aspect. The CPP may in particular comprise instructions which, when the CPP is executed by a computer system, such as the computer system according to the second aspect, cause the computer system to carry out the CIM according to the first aspect. The present invention may further provide for a tangible non-transitory computer-readable data carrier comprising the CPP. One of ordinary skill in the art will appreciate that the aspects of the present invention are hence interrelated. Therefore, all features disclosed in this document, above or below, may relate to each of these aspects, even if they have been disclosed in conjunction with a particular aspect.

Figure 2:
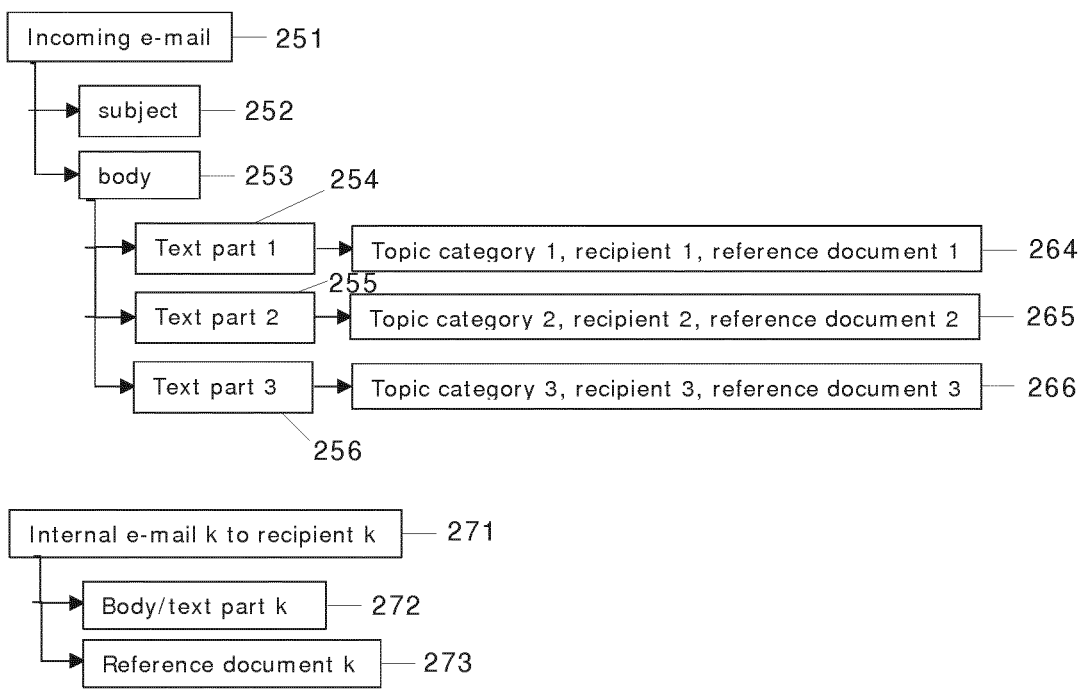
FIG. 2 shows a schematic overview of an embodiment of electronic messages and their processing according to the present invention.

Reference is made to FIG. 1, showing a schematic representation of a sequence of steps of the CIM, which are performed from start (101) to end (108). Reference is also made to FIG. 2, showing a schematic overview of an exemplary embodiment of electronic messages and their processing according to the present invention. An incoming electronic mail (251) comprising a subject (252) and a body (253) is received (102). Multiple text parts (254, 255, 256) of the body are determined (103). For each text part (254, 255, 256), a topic category (264, 265, 266) is selected based on natural language processing (NLP) (104). For each text part, a reference document (264, 265, 266) associated with the corresponding topic category is selected, based on NLP, from each of at least one document database (105). For each text part, a recipient (264, 265, 266) is obtained based on the corresponding topic category (106). For each text part, an electronic mail (271) is sent to the corresponding obtained recipient, whereby the mail comprises: the body or the corresponding text part (272); and each corresponding selected reference document (273) or a pointer to each corresponding selected reference document (107).

One electronic mail per text part may be sent. Alternatively, one electronic mail per unique obtained recipient may be sent, whereby the electronic mail comprises the body or all text parts with the same corresponding topic category, as well as all reference documents selected for all text parts with the same corresponding topic category. An electronic mail to an obtained recipient may thereby comprise the incoming electronic mail as attachment. Additionally or alternatively, an electronic mail to an obtained recipient may thereby comprise a body comprising said body of the incoming electronic mail or said corresponding text part of said body of said incoming electronic mail.

The present invention is advantageous as it allows for splitting an electronic mail comprising multiple questions into multiple text parts, wherein each text part comprises a question, and forwarding a particular text part together with relevant documentation (or a pointer thereto) to a corresponding expert. Said splitting may be based on text part boundary detection based on NLP, paragraph delimitations, and/or specific characters (such as, for example, a question mark). In addition, the decoupling of the selection of a topic category and (a) reference document(s) is advantageous as it allows to utilize an optimal NLP algorithm per selection.

In a preferred embodiment, before selecting for each text part a reference document from each of the at least one document database, a verification whether two text parts can be aggregated is performed. The verification whether two text parts can be aggregated comprises several steps. It is verified whether the two text parts comprise a common topic category. In case the two text parts comprise a common topic category, a similarity value is calculated for the two text parts, based on NLP. Preferably, the similarity value is a cosine similarity value. Preferably, a feature vector representation (FVR) for each text part of the two text parts is obtained, and the similarity value is determined based on the FVRs of the two text parts. A condition for the similarity value is verified, and in case the condition for the similarity value is fulfilled, the two text parts are aggregated into one aggregated text part. One of ordinary skill in the art will appreciate that if at least one aggregated text part is formed, the number of text parts for which a topic category is selected (prior to aggregation) is larger than the number of text parts for which a recipient and (a) reference document(s) are selected (posterior to aggregation).

This is advantageous because related or very similar questions of different text parts may be combined in the aggregated text part, before forwarding them to a recipient associated with the corresponding topic category. Without the screening for aggregation, it may occur that a first question would be sent to a first recipient, and a second question to a second recipient, while the questions are related (for example, the second question referring to the first question) or while the questions are very similar. This situation may lead to duplicate work by the first and second recipient and/or insufficient context for one or both of the recipients to answer the corresponding question. The solution in this preferred embodiment mitigates the associated problem.

In a most preferred embodiment, the method comprises the steps of:
receiving an electronic mail comprising a subject and a body;
determining multiple text parts of the body;
determining for each text part, based on natural language processing:
a topic category;
a feature vector representation;
verifying whether two text parts comprise a common topic category;
in case the two text parts comprise a common topic category:
calculating a similarity value, preferably cosine similarity value, for the two text parts based on their feature vector representations;
verifying a condition for the similarity value;
in case the condition for the similarity value is fulfilled, aggregating the two text parts into one aggregated text part and determining a feature vector representation for the aggregated text part,
selecting for each text part, based on a feature vector representation associated with the text part:
a reference document associated with the corresponding topic category from each of at least one document database,
obtaining for each text part a recipient based on the corresponding topic category;
sending for each text part to the obtained recipient an electronic mail comprising the body or the text part, and each selected reference document or a pointer to each selected reference document.

The text part aggregation has the advantageous technical effects of:
lowering the required computational resources of selecting for each text part a document associated with the topic category, as there are less text parts;
reduction in the total number of outgoing e-mails, as there are less text parts.

In comparison with US 2005/0 283 474 A1 paragraph [0151], where the same answer is retrieved multiple times for multiple questions which are fundamentally the same, but which are merely phrased in a different way, the present invention provides for question aggregation before handling the question.

Figure 3:
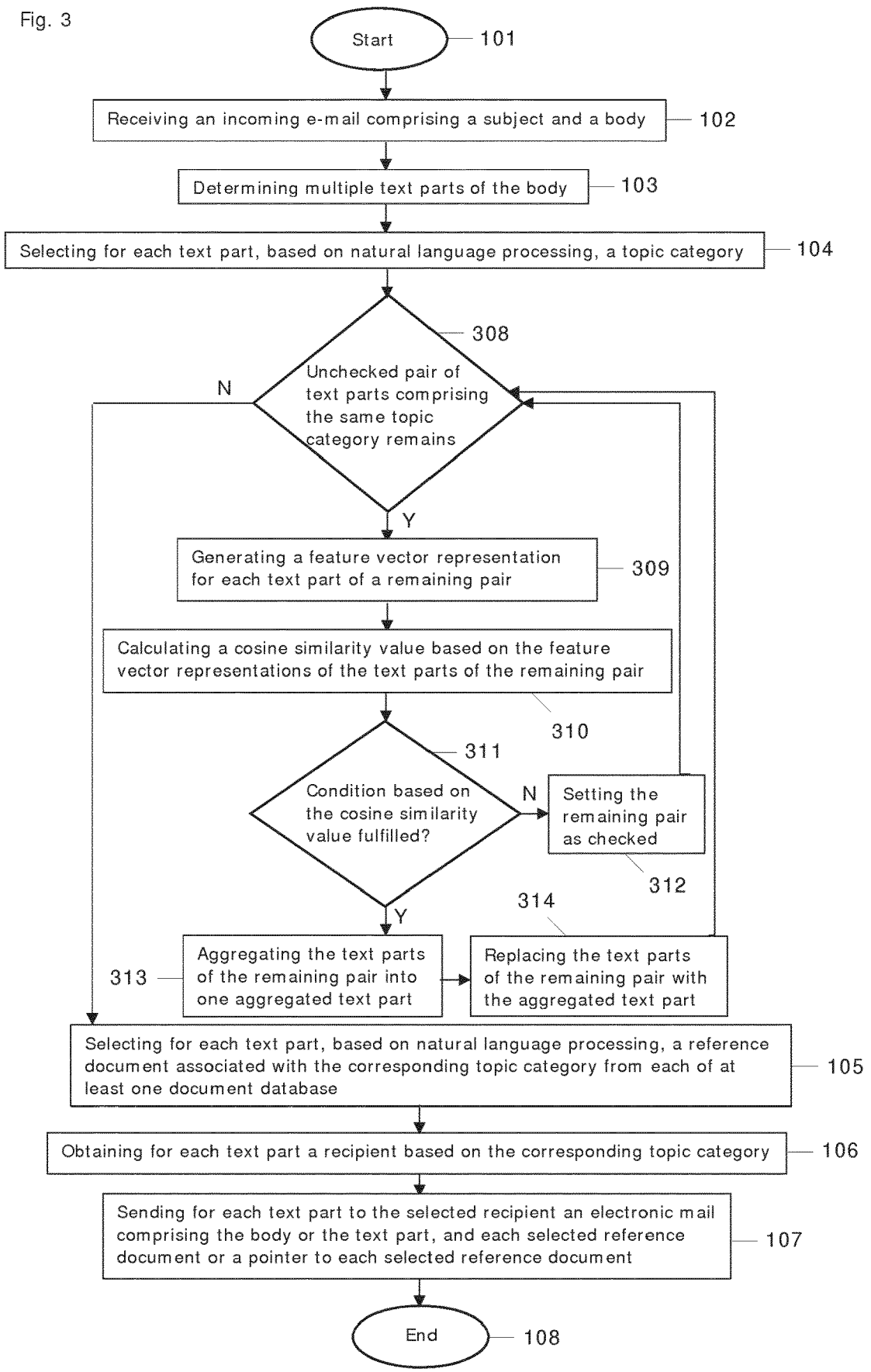

Reference is made to FIG. 3, showing a schematic representation of a sequence of steps of an embodiment of an algorithm according to the present invention, which steps are performed from start (101) to end (108). The steps comprising a reference number which is also present in FIG. 1, are identical. In between steps (104) and (105), i.e. in between the selection of a topic category for each text part based on NLP, and the selection for each text part of a reference document associated with the topic category of the text part, verification is performed whether text parts can be pairwise aggregated. Eligibility for aggregation can be screened per topic category. An initial sorting of the text parts per topic category may thereto be performed. Per topic category, it is verified whether an unchecked pair of text parts remains (308). If there are initially N text parts comprising a particular topic category, and no verification has been performed yet, there are N(N−1)/2 unchecked pairs of text parts. In case no unchecked pairs remain, recipients and reference documents are selected (105). In case there is a remaining unchecked pair of text parts, a FVR for each text part of the remaining pair is obtained or generated (309). One of ordinary skill in the art will appreciate that a FVR for a text part may be generated once, and reused for multiple verifications. A cosine similarity value based on the FVRs of the text parts of the remaining pair is calculated (310). In case a condition based on the cosine similarity value is fulfilled (311), the text parts of said remaining pair are aggregated into one aggregated text part (313), and the text parts of said remaining pair are replaced with the aggregated text part (314). One of ordinary skill in the art will appreciate that the aggregated text part comprises the topic category of the text parts of said remaining pair. All potential pairs comprising said aggregated text part are unchecked. In case the condition is not fulfilled (311), the remaining pair is set or marked as checked (312).

In a preferred embodiment, a Siamese neural network is trained with a plurality of pairs of text parts and a binary classification for each pair of text parts of the plurality as SIMILAR or DISSIMILAR. One of ordinary skill in the art will appreciate that SIMILAR and DISSIMILAR denote the two values for binary classification, and may, depending on the implementation, be embodied by, for example, a Boolean value, a number, a numerical value, a letter, a tag, or the like. The similarity value for said two text parts is then determined based on the trained Siamese neural network and said two text parts.

In a preferred embodiment, the Siamese neural network is trained to generate for each text part of a pair a FVR to classify the pair as SIMILAR or DISSIMILAR based on a condition for a similarity value based on the generated FVRs for the text parts of the pair. The similarity value for said two text parts is then determined based on the FVRs generated by the trained Siamese neural network for said two text parts.

In a preferred embodiment, one or more mail items of the incoming electronic mail are each preprocessed to a preprocessed mail item. A mail item may be the subject, the body or a text part. The subject may be preprocessed to a preprocessed subject. The body may be preprocessed to a preprocessed body. Each text part may be preprocessed to a preprocessed text part. Herein, preprocessing of a mail item to a preprocessed mail item may comprise removing and/or replacing a subpart of the mail item based on a regular expression or an identity. Preferably, for a text part, and more preferably for each text part, a topic category and/or a reference document from each of the at least one document database is selected based on the preprocessed text part. The preprocessing may hence provide for removing a subpart, such as removing a signature, a web link, a one-character word, a punctuation, a number, and a predetermined word, from the mail item based on a regular expression or an identity. Alternatively and/or additionally, the preprocessing may provide for replacing a subpart, such as replacing an accented character with a non-accented character, replacing an upper case character with a lower case character, reducing a word to a word stem, and unifying an abbreviation, in the mail item based on a regular expression or an identity.

This is advantageous as NLP of text items may fail if the text items are cluttered with spelling mistakes, various versions of abbreviations, various synonyms, and (within the context) semantically irrelevant language. Stripping and/or rectifying the text items before NLP may not only speed up the NLP, but may also influence the success of the NLP.

In a preferred embodiment, a classification algorithm is trained with a plurality of training items to determine a topic category for a text part. Each training item is associated with a topic category. For each training item a FVR is determined. Preferably, the at least one document database comprises the plurality of training items. A classification algorithm is trained, based on the determined FVR and the topic category of each training item, to provide a probability vector for topic category based on a FVR. In this embodiment, for a text part, preferably each text part, a FVR may be determined, and the topic category may be obtained based on the FVR and the trained classification algorithm.

In a preferred embodiment, a FVR of an item is based on at least one, preferably at least two, and more preferably all, of: a first, a second, and a third FVR. For the first FVR, for each word of the item a contextual vector, such as via word2vec, and an inverse document frequency (IDF) is obtained. The first FVR is a weighed aggregation of the contextual vectors of all words of the item, whereby the weighing is based on IDF. The second FVR is based on term frequency multiplied with inverse document frequency (TF-IDF) for words and neighboring word pairs. The third FVR is based on a predetermined list of words each of which is linked to a topic category. The third FVR comprises for each topic category one or more of a number of words or a percentage of words associated with the topic category. The FVR of the item may thereby comprise a concatenation of any two or all three of the first, the second, and the third FVR. The FVR of the item may thereby be based on a FVR function based on any two or all three of the first, the second, and the third FVR. In a preferred embodiment, each of the first, the second and the third FVR can be selectively included or excluded for determining a FVR of an item.

In a preferred embodiment, the at least one document database is at least two document databases, whereby the at least two document databases comprise a reference electronic mail database. Preferably, for each text part, the topic category is selected based on electronic mails from said reference electronic mail database. An electronic mail may comprise metadata, such as number of recipients and time information. Preferably, the FVR of an item or training item is based on metadata of an electronic mail comprising the item or the training item. In a preferred embodiment, the metadata of an electronic mail can be selectively included or excluded for determining a FVR of an item.

In a preferred embodiment, for a database, preferably each database, of the at least one document database, selection of a reference document is based on N-character N-grams. For each reference document of the database and all N-character N-grams of the reference document, with $N \geq 3$, preferably $N=3$, term frequency multiplied with inverse document frequency (TF-IDF) may be determined. A summed vector, which comprises per N-gram the sum of said TF-IDF over the reference documents of the database, may be obtained. A predetermined percentage of N-grams, based on magnitude of the values in the summed vector, preferably the largest values, may be selected. Preferably, the percentage is at least 1 and at most 36, more preferably at least 2 and at most 20, even more preferably at least 4 and at most 16, yet even more preferably at least 8 and at most 12, and most preferably in essence 10. For a text part, a similarity value, preferably cosine similarity value, may be determined for each reference document of the database with the text part based on N-gram FVRs of the document and the text part comprising the TF-IDF for the selected N-grams. The reference document may then be selected from the database based on the magnitude of the similarity value.

In a preferred embodiment, for a database, preferably each database, of the at least one document database, selection of a reference document is based on a FVR comprising a weighed aggregation of contextual vectors. For each reference document of the database, a FVR based on an aggregation of contextual vectors for each word in the reference document, such as a weighed aggregation of contextual vectors determined via word2vec, may be determined. Preferably, the weighing is based on inverse document frequency (IDF). For a text part, a FVR may be determined, based on weighed aggregation of contextual vectors for each word in the text part. A similarity value, preferably a cosine similarity value, may be determined for each reference document of the database with the text part, based on the FVRs of the document and the text part. A reference document may be selected from the database based on magnitude of the similarity value.

In a preferred embodiment, a sequence to sequence module comprising a recurrent neural network is trained with reference electronic mails, mail bodies or text parts of mail bodies and corresponding replies to transform an incoming electronic mail, a mail body, or a text part to a reply. A draft reply to an incoming electronic mail may then be generated via the sequence to sequence module. The electronic mail to the obtained recipient may then comprise the draft reply. Preferably, the sequence to sequence module is an encoder-decoder long short-term memory network.

The invention is further described by the following non-limiting example which further illustrates the invention, and is not intended to, nor should it be interpreted to, limit the scope of the invention.

Example

A lot of banking and insurance products have their own dedicated expert mailbox, to which agents can send questions regarding these products, for example insurance policies. Experts answering these questions spend a significant amount of time providing custom responses to incoming emails. In addition to retrieval of the relevant email addresses by the agents, the individual generation of a custom response per incoming email, also requires considerable time investment. Banking and insurance experts examine incoming questions, consult internal rules, regulations, terms and conditions, and the like, and handcraft responses tailor-made per incoming email.

The present example provides an automated solution based on natural language processing and statistical analytical and machine learning techniques to facilitate the process for the agents as well as the experts, by providing an algorithm which can reroute emails to the correct expert mailbox, and which can generate suggested responses and retrieve relevant documentation for answering an incoming email.

Figure 4:
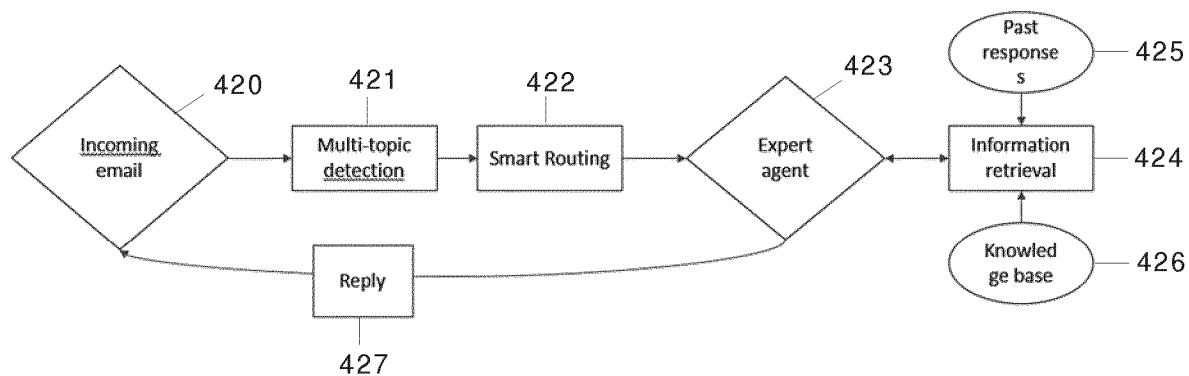
FIGS. 4 to 8 show schematic overviews of aspects of data processing of embodiments according to the present invention.

Reference is made to FIG. 4. An incoming email (420) is processed by a multi-topic detection algorithm (421), which is configured to detect the number of different questions an email contains and to split up the email into these different questions. Each question is processed by a smart routing algorithm (422), which is configured to determine which product or service (topic category) the question is related to, in order to route the question to a corresponding expert recipient (423). An information retrieval algorithm (424) is configured to retrieve relevant historical email data (comprising relevant responses) (425) and digital documents from a knowledge base (426) containing rules, regulations, terms and conditions for the banking and insurance products and services. The information retrieval algorithm (424) is further configured to construct a draft reply. In particular, natural language processing and machine learning are used to generate suggested responses to incoming questions based on the past answers (425) and the digital documents (426). The draft reply may be edited by the expert, after which a partial reply (427), i.e. a reply to the particular question, is formed. The partial replies may be sent in separate emails or in an aggregated email to the sender of the incoming email.

I. Multi-Topic Detection Algorithm

An incoming email may comprise questions about different policies (topic categories). An incoming email may furthermore comprise multiple questions within the same policy. The multi-topic detection algorithm is configured to detect the different policies, and to detect different questions within the same policy.

Figure 5:
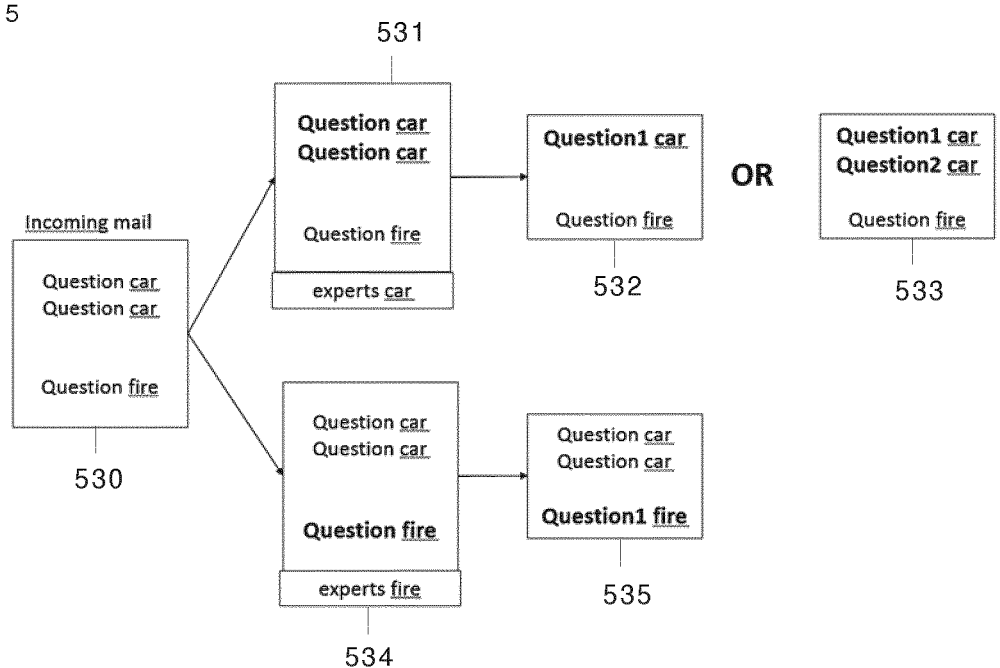

Reference is made to FIG. 5. An incoming email (530) may comprise multiple questions about different policies (topic categories). The incoming email is split up into different paragraphs on the assumption that agents start a new paragraph for another type of policy. The smart routing algorithm (below) may be used to select a topic category for each paragraph. In the example of FIG. 5, two policies (531, 534) are detected for the incoming email (530).

The detection of different questions may be performed based on sentences and delimiters for sentences, such as, for example, a question mark. Questions may be related or identical, or may be of substantially different nature, and may in the latter case require separate handling. In case questions are identified as related or identical, they are aggregated (532). In case questions are identified as substantially different, they are treated separately (533). For topics comprising only one question (535), this check does not have to be performed.

A first embodiment, an unsupervised approach, is based on similarity between numerical representations (for example word2vec, tf-idf) of the questions (or paragraph/context/"text part" which comprises the questions).

Figure 6:
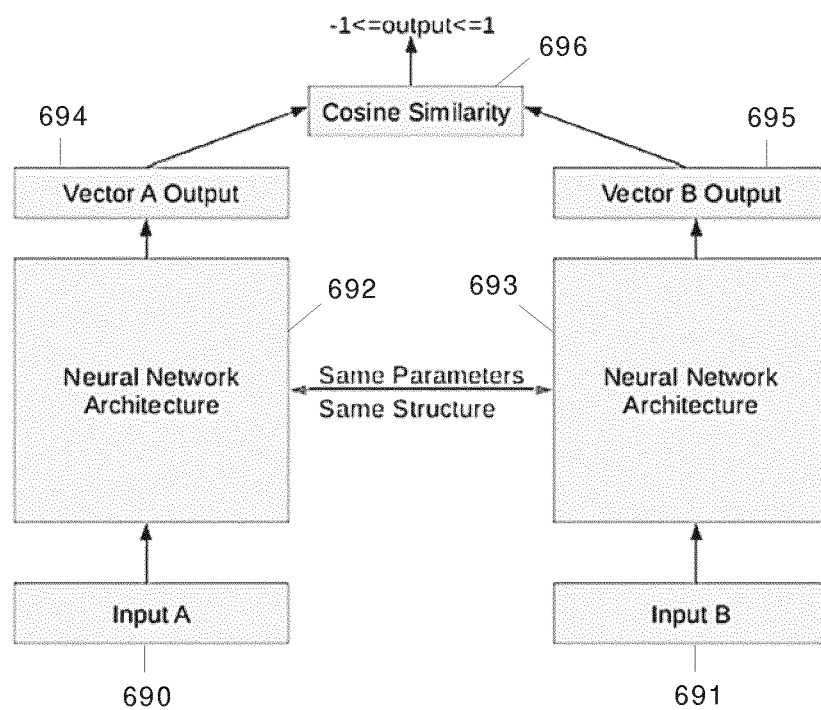

A second preferred embodiment is based on a Siamese neural network. Reference is made to FIG. 6. Questions in a training set of emails are labeled as SIMILAR or DISSIMILAR, and the model learns to represent the questions with feature vector representations in such a way that similar questions have high similarity and different questions have a low similarity. The trained Siamese neural network (692, 693) then generates for each of two input questions (or paragraphs/contexts/"text parts" comprising them) (690, 691) a feature vector representation (694, 695), based on which a cosine similarity value (696) may be determined to classify the questions as SIMILAR or DISSIMILAR.

II. Smart-Routing Algorithm a. Introduction

The goal of the smart-routing algorithm is to route an email or part of an email to the correct mailbox based on the topic or theme of the email or the part. This allows sending of an email by an agent to a general mailbox, instead of having to select the right mailbox out of a variety of possibilities. The smart-routing algorithm comprises multiple modules, each capable of transforming an email or part of an email to a specific numerical feature vector representation. The different modules utilize different natural language processing techniques. The modules can be used standalone or can be combined.

The feature vector representations generated by one or more modules are fed to a classification algorithm which has been trained using supervised learning techniques. The algorithm calculates the probability that an email corresponds to a particular topic and/or recipient.

b. Preprocessing

Before an email is passed to the smart-routing algorithm, preprocessing is performed. The text data is preprocessed according to the following steps:

All email signatures are removed based on a regular expression which finds common email closings (e.g. "sincerely").

All URLs and weblinks are removed based on a regular expression.

Accented characters in the text are replaced with their non-accented ASCII equivalents (e.g. "client" is transformed to "client").

Punctuation and numbers are removed.

Text is converted to lower case.

Common stopwords (e.g. words that occur frequently but have little meaning such as "the"), corpus-specific stopwords (e.g. words that occur frequently in the context of the company which employs the present technology, but do not provide much meaning within the context, such as the particular company name), and frequently occurring words not related to the context (e.g. "hello") are removed.

Words are transformed to stem words, their base or root form (e.g. "working" is transformed to "work").

One-character words are removed.

Terms and commonly used abbreviations are harmonized (e.g. "housepol" is transformed to "house policy").

c. Feature Vector Representations

The smart routing algorithm of the present example comprises four feature vector representation modules, which allow to transform an email (or part thereof) to a numerical representation. The different modules use different natural language processing techniques, so each module is able to represent an email (or part thereof) in a different way. An email (or part thereof) can be represented using one or multiple modules. The smart routing algorithm is developed so that new modules can be easily added.

i. Word2vec Module

The word2vec module is trained with all historical emails, more in particular the text of an email body concatenated with the text of an email subject. Each word of a vocabulary can be represented as a high-dimensional vector. Inverse document frequency scores are calculated for each word in the vocabulary. All word embedding vectors of one email are aggregated into one final vector, whereby a word vector comprises the inverse document frequency as weight.

ii. Bag-of-Words Module

The bag-of-words module weighs the words according to term frequency multiplied with inverse document frequency. The module also incorporates bigrams to store spatial information from the text. The module in particular generates two vectors per email: one email body representation and one email subject representation.

iii. Email Metadata Module

The email metadata module generates a feature vector representation for every email based on the following features, preferably comprising the following features:

Does the email contain an address? (e.g. yes/no)

Does the email contain an attachment? (e.g. yes/no)

Number of "TO" recipients (e.g. integer)

Does the email contain "CC" recipients? (e.g. yes/no)

Number of "CC" recipients (e.g. integer)

Hour on which the email is sent (e.g. integer)

Day on which the email is sent (e.g. categorical)

Is the email sent on a working day/weekday? (e.g. yes/no)

Is the email sent during working hours? (e.g. yes/no)

What is the email importance? (e.g. low/medium/high)

Number of words in the email body (e.g. integer)

Number of words in the email subject (e.g. integer)

Number of characters in the email body (e.g. integer)

Number of characters in the email subject (e.g. integer)

Number of newlines in the body divided by the number of characters in the body (e.g. real number)

Number of forwards (e.g. integer)

iv. Expert Knowledge Module

The expert knowledge module tries to capture expert and background knowledge about a particular domain into the model. This can be used to steer the model in a direction whenever the previously mentioned feature vector representation modules are not enough to capture the more subtle meanings of an incoming email.

The expert knowledge module comprises a framework where domain experts are asked to label certain words that generate a high lift towards one of more topic categories. High-lift words are words that occur a lot in one or more email topics, when compared to all emails, thus generating a lift towards these specific topics.

A list comprising words may automatically be generated by the module, whereby some words of the list may be labeled as high-lift words by the experts. The experts may also add words to the list that were not generated by the module. Labeled words may also be manually extended with regular expressions so that every possible notation of a word, including typographical errors and synonyms, is encapsulated into the module. The module generates a feature vector representation comprising for each predefined topic category the following four numerical feature values:

Number of email body words linked to the topic category.

Number of email subject words linked to the topic category.

Percentage of email body words linked to the topic category.

Percentage of email subject words linked to the topic category.

III. Information Retrieval a. Introduction

The information retrieval algorithm utilizes historical email data as well as knowledge base data.

The historical email data comprises existing answers that a given department has sent to clients about a certain topic. This data serves as a source of potential answers to incoming questions which will be searched by the algorithm for their relevance to incoming questions. For each new incoming question, the most similar answer(s) from the historical email data is identified, under the assumption that similar answers are most likely to be useful/relevant to answer the incoming question.

The knowledge base data comprises internal rules, regulations, terms and conditions, for bank and insurance products and services. This data serves as a source of helpful reference documents to answer incoming questions which will be searched by the algorithm for their relevance to incoming questions. For each new incoming question, the most similar text from the knowledge base data is identified, under the assumption that similar texts are most likely to be useful/relevant to answer the incoming question.

Figure 7:
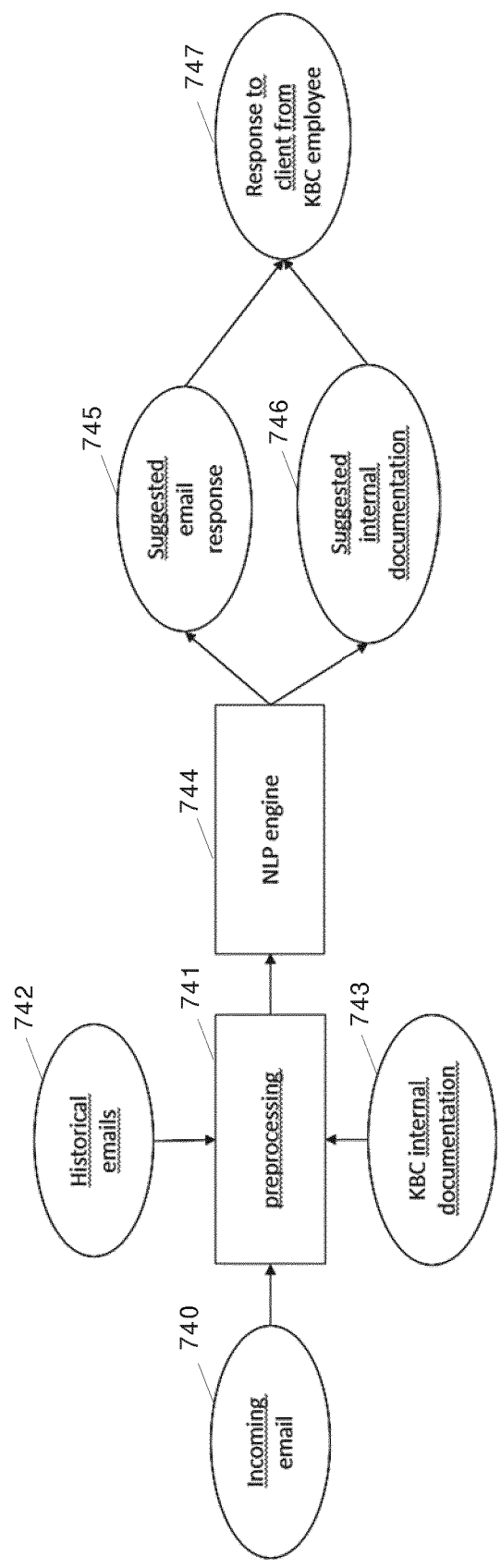

Reference is made to FIG. 7. Incoming emails (740), historical email data (742), and knowledge base data (743) are first preprocessed (741) prior to analysis. The preprocessing may thereby be performed as described in section (II.b) of this example (above). The cleaned data are then analyzed (744) via natural language processing and statistical techniques in order to identify relevant responses (745) and internal documentation (746) for each incoming email. The suggestions may then be utilized by the expert for providing an answer to the incoming email (747).

The information retrieval algorithm based on natural language processing may be based on statistical techniques and/or deep learning techniques. The information retrieval algorithm is configured to retrieve a reference document from each document database (documents to search over; historical emails; knowledge base documents) for an item, i.e. an incoming email, email body, or text part of an email body.

b. Statistical Approach

As discussed above, preprocessing is initially performed.

For each document database, a term frequency-inverse document frequency (tf-idf) matrix is constructed. All possible three-character trigrams are extracted. A subselection of trigrams is made as follows. All the tf-idf values are summed for each trigram. Only the trigrams with summed tf-idf values in the top 10% of the resulting distribution are retained. The tf-idf values of the retained trigrams form the feature vector representation of a reference document or item.

The feature vector representations are used to calculate all pairwise cosine similarities between the item and each reference document. The reference document or reference documents with highest cosine similarity to the item are recommended to the expert for aiding in drafting a reply.

The process is performed for the historical email data as well as for the knowledge base data, in order to provide relevant suggestions for both bodies of documents for each incoming email. One of ordinary skill in the art will appreciate that different sets of trigrams may be retained for each database, i.e. different trigrams may be retained for the historical email data and for the knowledge base data.

Figure 8:
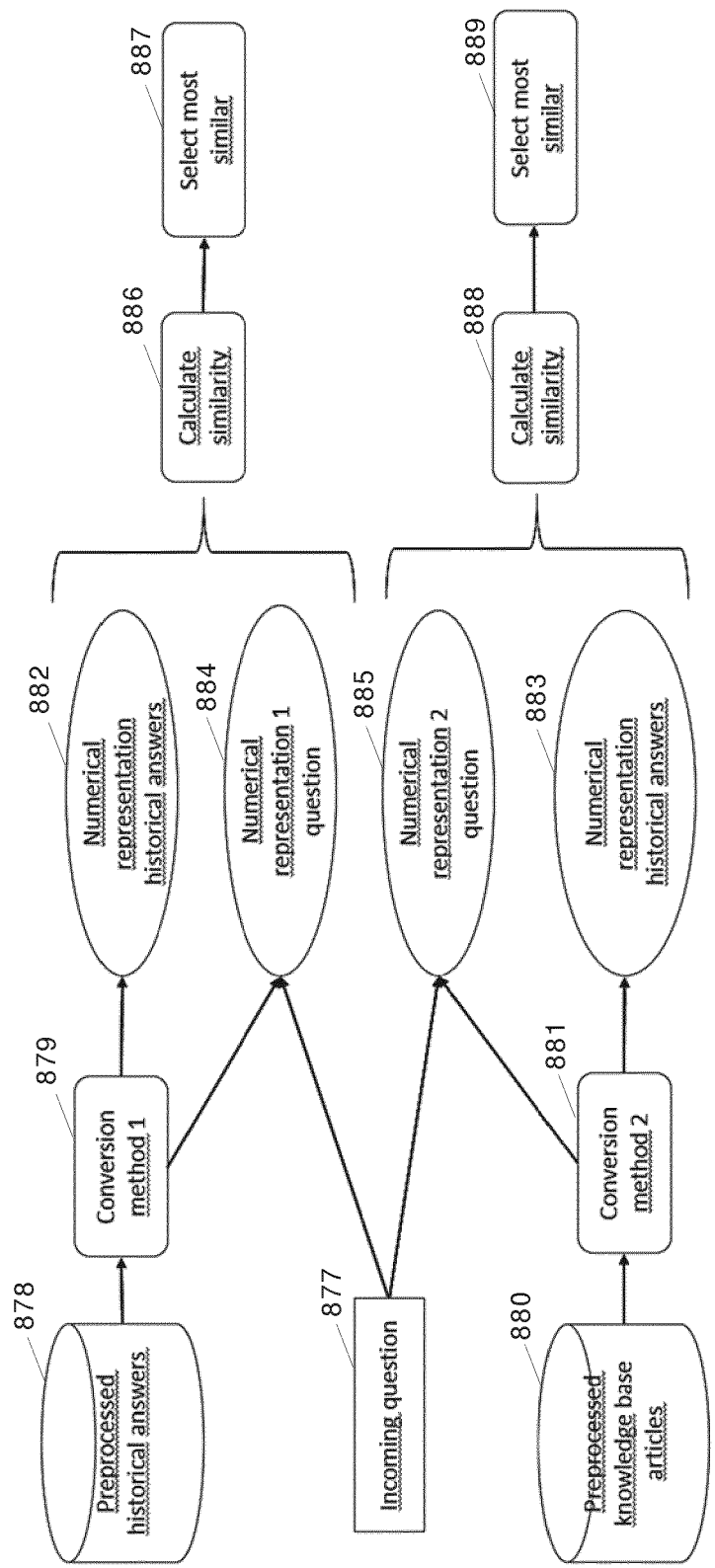

Reference is made to FIG. 8. Historical email data is preprocessed (878). Documents of the knowledge base data are preprocessed (880). For each type of document, a set of retained trigrams is determined (879, 881), as disclosed above. For an incoming item (877), a feature vector representation (884, 885) for each of the historical email data and the knowledge base data is constructed. A historical email is retrieved for the incoming item, by calculating cosine similarity values (886) for the corresponding feature vector representation of the incoming item (884) and the feature vector representation for each historical email (882), and selecting the most similar historical email (887). A document from the knowledge base is retrieved for the incoming item, by calculating cosine similarity values (888) for the corresponding feature vector representation of the incoming item (885) and the feature vector representations for each document from the knowledge base (883), and selecting the most similar document (889).

c. Deep Learning Approach

The deep learning approach requires less data cleaning. In particular, all generic parts (like cleaning out email signatures, URLs, punctuation, numbers, uppercase/lowercase) can be kept, while stem words, term harmonization and abbreviation harmonization need not be performed, but may be performed, as the model will learn that such words are similar.

A first embodiment is based on cosine similarity matching, wherein a text is converted to a feature vector representation based on a deep learning algorithm, such as, for example, word2vec. Words that appear in the same context (i.e. have the same surrounding words) will be modelled as similar to each other. This model can, for example, learn that the words "car" and "vehicle" are very similar, even though on a pure word basis, there is no similarity between them. As output, each word will have its own word2vec representation. Based on aggregation, e.g. weighed averaging or maximums, of the individual word2vecs of documents, similarity can be assessed based on a cosine similarity value.

A second alternative embodiment is based on a sequence to sequence model, such as, for example, an LSTM encoder/decoder. The sequence to sequence model comprises two recurrent neural networks, which work together to transform the input, an incoming item comprising a question, to an output, the answer. The newly constructed answer by the sequence to sequence model based on historical email data may then be presented to the expert for reviewing and/or editing.

The invention claimed is:

1. Computer-implemented method for electronic mail routing, comprising the steps of:
   receiving an electronic mail comprising a subject and a body;
   determining multiple text parts of the body;
   determining for each text part, based on natural language processing:
   a topic category;
   selecting for each text part, based on natural language processing:
   a reference document associated with the corresponding topic category from each of at least one document database,
   obtaining for each text part a recipient based on the corresponding topic category;
   sending for each text part to the obtained recipient an electronic mail comprising the body or the text part, and each selected reference document or a pointer to each selected reference document,
   wherein the method comprises, before the step of selecting for each text part a reference document from each of the at least one document database, the steps of:
   determining for each text part, based on natural language processing:
   a feature vector representation;
   verifying whether two text parts comprise a common topic category;
   in case the two text parts comprise a common topic category:
   calculating a similarity value, preferably cosine similarity value, for the two text parts based on their feature vector representations;
   verifying a condition for the similarity value;
   in case the condition for the similarity value is fulfilled, aggregating the two text parts into one aggregated text part and determining a feature vector representation for the aggregated text part, and wherein the step of selecting for each text part, based on natural language processing, a reference document associated with the corresponding topic category from each of at least one document database is the step of:
   selecting for each text part, based on a feature vector representation associated with the text part, a reference document associated with the corresponding topic category from each of at least one document database.

2. Computer-implemented method according to preceding claim 1, comprising the step of training a Siamese neural network with a plurality of pairs of text parts and a binary classification for each pair of text parts as SIMILAR or DISSIMILAR, wherein the similarity value for the two text parts is determined based on the trained Siamese neural network and the two text parts.

3. Computer-implemented method according to preceding claim 2, wherein the Siamese neural network is trained to provide for each text part of a pair a feature vector representation to classify the pair as SIMILAR or DISSIMILAR based on a condition for a similarity value based on the feature vector representations for the text parts of the pair, wherein the similarity value for the two text parts is determined based on the feature vector representations provided by the trained Siamese neural network for the two text parts.

4. Computer-implemented method according to claim 1, wherein the method comprises the step of preprocessing one or more mail items of the incoming mail to a preprocessed item, wherein a mail item is the subject, the body or a text part, wherein preprocessing a mail item to a preprocessed mail item comprises removing and/or replacing a subpart of the mail item based on a regular expression or an identity, wherein preferably for a text part a topic category and/or a reference document from each of the at least one document database is selected based on the preprocessed text part.

5. Computer-implemented method according to claim 1, comprising the steps of:
  determining for each training item of a plurality of training items, wherein each training item is associated with a topic category, a feature vector representation, preferably said at least one document database comprising the plurality of training items;
  training a classification algorithm, based on the determined feature vector representation and the topic category of each training item, to provide a probability vector for topic category based on a feature vector representation; —determining the topic category for the text part based on the feature vector representation of the text part and the trained classification algorithm, wherein a training item comprises a text document, a subject of an electronic mail, a body of an electronic mail, and/or a text part of a body of an electronic mail.

6. Computer-implemented method according to claim 1, wherein the feature vector representation of an item is based on at least one, preferably at least two, and more preferably all of:
  a first feature vector representation, wherein for each word of the item a contextual vector, such as via word2vec, and an inverse document frequency are obtained, whereby the first feature vector representation is a weighed aggregation of the contextual vectors of all words of the item, whereby the weighing is based on inverse document frequency;
  a second feature vector representation, based on term frequency multiplied with inverse document frequency of words and neighboring word pairs;
  a third feature vector representation, based on a predetermined list of words each linked to a topic category, wherein the third feature vector representation comprises for each topic category one or more of a number of words or a percentage of words associated with the topic category,
    wherein an item comprises a text document, a subject of an electronic mail, a body of an electronic mail, and/or a text part of a body of an electronic mail.

7. Computer-implemented method according to claim 1, wherein said at least one document database is at least two document databases comprising a reference electronic mail database, wherein for each text part the topic category is selected based on electronic mails from said reference electronic mail database.

8. Computer-implemented method according to claim 1, wherein an electronic mail comprises metadata, such as number of recipients and time information, wherein the feature vector representation of an item is based on metadata of an electronic mail comprising the item, wherein an item comprises a text document, a subject of an electronic mail, a body of an electronic mail, and/or a text part of a body of an electronic mail.

9. Computer-implemented method according to claim 1, comprising for a database, preferably each database, of the at least one document database, the steps of:
  determining for each reference document of the database and all N-character N-grams of the reference document, with N 3, term frequency multiplied with inverse document frequency;
  obtaining a summed vector, comprising per N-gram the sum of the term frequency multiplied with inverse document frequency over the reference documents of the database;
  selecting a predetermined percentage of N-grams, based on magnitude of the values in the summed vector,
wherein for a text part a reference document is selected from the database by:
  determining a similarity value, preferably cosine similarity value, for each reference document of the database with the text part based on N-gram feature vector representations of the document and the text part comprising term frequency multiplied with inverse document frequency for the selected N-grams; and
  selecting the reference document from the database based on magnitude of the similarity value.

10. Computer-implemented method according to claim 1, comprising for a database, preferably each database, of the at least one document database, the steps of:
  determining for each reference document of the database a feature vector representation, based on an aggregation of contextual vectors for each word in the reference document, such as a weighed aggregation of contextual vectors determined via word2vec, whereby preferably the weighing is based on inverse document frequency; —determining for a text part a feature vector representation, based on aggregation of contextual vectors for each word in the text part; —determining a similarity value, preferably cosine similarity value, for each reference document of the database with the text part based on the feature vector representations of the document and the text part;
  selecting the reference document from the database based on magnitude of the similarity value.

11. Computer-implemented method according to any one of the preceding claims, comprising the steps of:
  training a sequence to sequence module comprising a recurrent neural network, preferably an encoder-decoder long short-term memory network, with reference electronic mails, mail bodies or text parts of mail bodies and corresponding replies to transform an incoming electronic mail, a mail body or a text part to a reply; and
  generating a draft reply to an incoming electronic mail via the trained sequence to sequence module,
    wherein the electronic mail to the obtained recipient comprises the draft reply.

12. Computer system for electronic mail routing, wherein the computer system is configured for performing the computer-implemented method according to claim 1.

* * * * *